Jan. 14, 1969  L. J. BECKHAM  3,422,109
PRODUCTION OF TETRAIMINOPIPERAZINE
Filed March 30, 1966
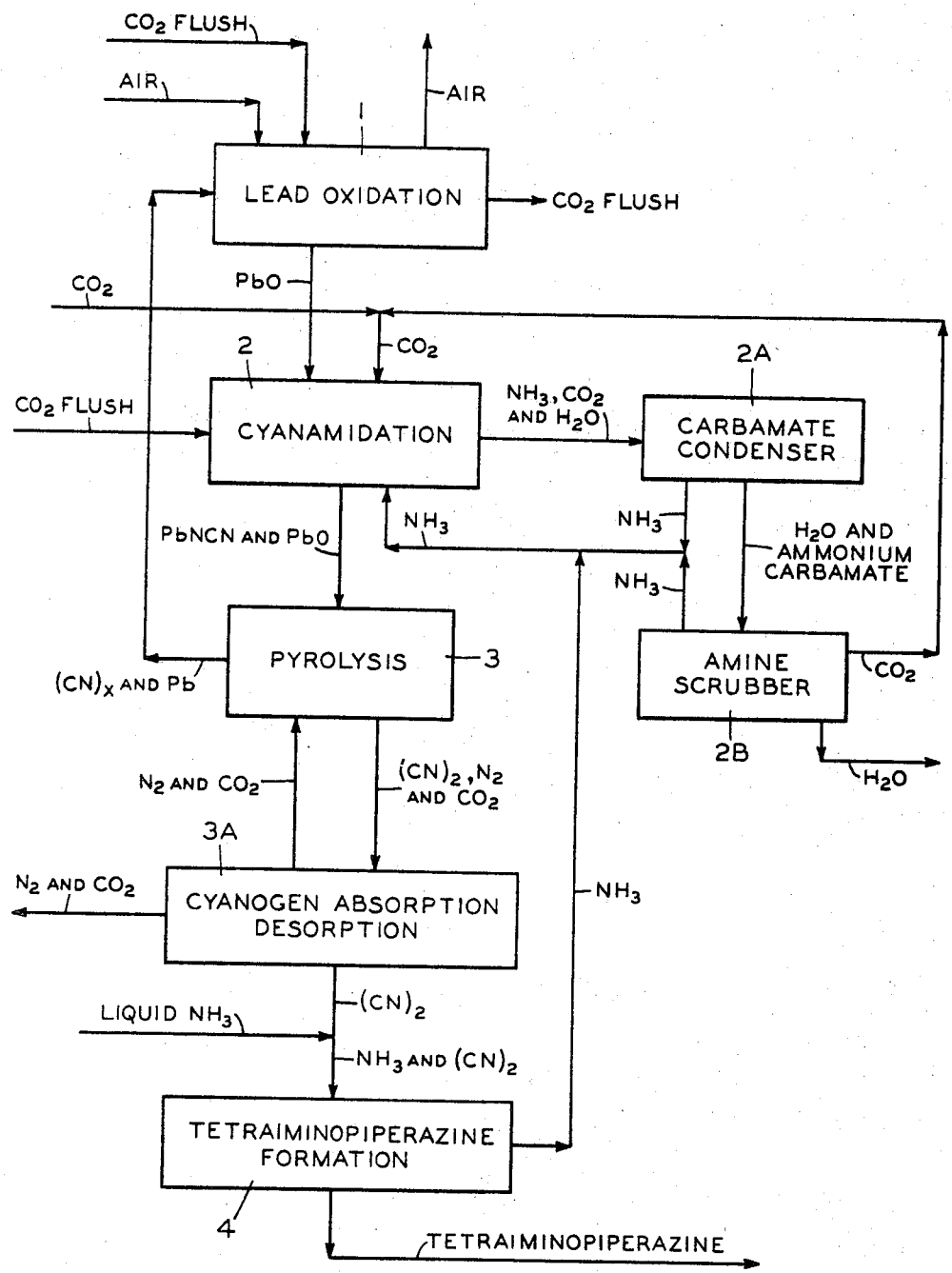
INVENTOR
LELAND J. BECKHAM
BY
Frederick H. Weinfeldt
ATTORNEY

United States Patent Office 3,422,109
Patented Jan. 14, 1969

3,422,109
PRODUCTION OF TETRAIMINOPIPERAZINE
Leland J. Beckham, Chesterfield County, Va., assignor to Allied Chemical Corporation, New York, N.Y., a corporation of New York
Filed Mar. 30, 1966, Ser. No. 538,832
U.S. Cl. 260—268                           4 Claims
Int. Cl. C07d 51/66

ABSTRACT OF THE DISCLOSURE

A process for production of lead cyanamide, subsequent pyrolysis to cyanogen and reaction of the cyanogen with ammonia to produce tetra imino piperazine is described.

---

The invention relates to the production of tetraiminopiperazine.

There has been a continuing effort in the fertilizer field to provide insoluble nitrogen fertilizers at low cost; i.e. fertilizers which are not readily soluble in water and gradually decompose in the soil to nitrogen compounds which can be utilized by plants. For example, water insoluble ureaformaldehyde resin fertilizers have been developed but are relatively expensive. It is known that tetraiminopiperazine is useful as an insoluble nitrogen fertilizer. However, a low cost process for the production of tetraiminopiperazine has heretofore not been available.

It is an object of this invention to provide a process for the production of tetraiminopiperazine at low cost.

It is an additional object of this invention to provide a cyclic process for the production of tetraiminopiperazine, in which process only air, carbon dioxide and ammonia are consumed.

I have discovered that these and other objects can be achieved by the process of this invention which comprises:

(1) reacting lead oxide with carbon dioxide and ammonia to form lead cyanamide,
(2) pyrolyzing the lead cyanamide to lead and cyanogen, and
(3) reacting the cyanogen with ammonia to form tetraiminopiperazine.

A detailed description and illustrative examples of the process of this invention are presented hereinafter.

These reactions can be represented by the equations:

(1)  $2PbO + 4NH_3 + 2CO_2 \longrightarrow 2PbNCN + 6H_2O$
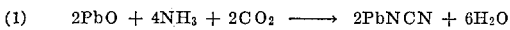
lead cyanamide (2)  $2PbNCN \longrightarrow (CN)_2 + N_2 + 2Pb$
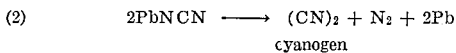
cyanogen (3)  $2(CN)_2 + 2NH_3 \longrightarrow C_4N_6H_6$
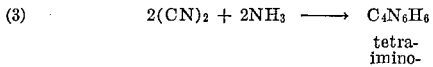
tetraiminopiperazine There is essentially no consumption of lead in the process as the lead formed by the pyrolysis of the lead cyanamide can be recycled for use in the formation of the lead oxide. Since air can be used to supply the oxygen for the formation of the lead oxide, the process of this invention can be carried out with only air, carbon dioxide and ammonia being consumed.

In carrying out the process of this invention each of the steps described above must be conducted independently of the others as conditions are different for each and reactants interfere. However, the steps leading to the formation of the cyanogen may be carried out in a fixed-bed reactor, in a fluidized bed, or in a molten lead pool. The reactor should be able to withstand 50 p.s.i.g. operating pressure and be lined with alumina or silica brick. No iron metals should be exposed in the reactor as this leads to loss of cyanogen as paracyanogen polymer, i.e. $(CN)_x$.

In carrying out the process of this invention, it is preferred that the lead oxide be supported on an inert carrier, such as "Alundum" an alumina carrier which is commercially available. When the lead oxide on the support is converted to lead in the process, the lead may be reactivated to the lead oxide state, e.g. by heating in the presence of air.

The lead oxide used initially can be obtained by the oxidation of lead or by other known means, such as by thermal decomposition of lead nitrate or lead carbonate.

The oxidation of lead to lead oxide with oxygen can be advantageously carried out at temperatures of from about 400° to 800° C., preferably at from about 550° C. to 750° C. Air is a preferred source of the oxygen. For example, molten lead can be oxidized by spraying into air.

At lower temperatures, $Pb_3O_4$ is formed which is not suitable for the preparation of lead cyanamide in the process of this invention.

In carrying out the formation of the lead cyanamide from lead oxide by reaction with ammonia and carbon dioxide, ratios of ammonia to lead oxide of at least 10:1 are suitable, ratios 20 to 200:1 being preferred; and molar ratios of carbon dioxide to lead oxide are at least 2:1 are suitable, 2 to 20:1 being preferred.

Suitable temperatures for the formation of the lead cyanamide are from 380° to 500° C., temperatures from about 425° to 450° C. being preferred. Temperatures above 500° C. are too high and result in oxidation of ammonia and reduction of lead oxide to lead. Reaction of lead oxide with lead cyanamide resulting in equivalent loss also occurs at this temperature. Lower temperatures result in slower reaction rate. Loss of ammonia was found to be negligible at 450° C. or below.

In order to obtain high yields in the process of this invention, the formation of the lead cyanamide must be carried out essentially in the absence of water. Accordingly, all reactants should be essentially free of water and it is preferred to remove the water of reaction from the reaction zone as it forms.

The wet unreacted carbon dioxide and ammonia may be recovered and used for such purposes as the manufacture of urea. However, it is preferred to have the unreacted carbon dioxide and ammonia recycled to the process. Water can be removed from the wet carbon dioxide and ammonia by conventional methods. It is preferred, however, to use a technique in which water is trapped in a carbamate condenser and separated in an amine scrubber, as described in Canadian Patent 715,123.

Pyrolysis of lead cyanamide can be advantageously carried out at temperatures of from about 650° to 750° C., preferably from about 700° to 750° C. It is preferred to carry out the pyrolysis in the presence of an inert gas such as helium, argon or nitrogen.

It is preferred to treat the gaseous pyrolysis products by an absorption-desorption technique involving passing the off gas from the pyrolysis into a solvent, such as toluene, where cyanogen is absorbed while nitrogen and carbon dioxide pass overhead; the solution is then heated driving off the cyanogen which is then used in the formation of tetraiminopiperazine.

In the process of this invention the reaction of the cyanogen with ammonia to form tetraiminopiperazine can be carried out in the gaseous or liquid state, e.g. in an inert solvent such as toluene. The reaction appears to occur on contact over a wide range of temperatures. It is preferred to admix the cyanogen with liquid ammonia, at about −80° to 50° C., and then evaporate off the ammonia leaving the resulting tetraiminopiperazine as residue. The ammonia can be recycled for use in the process. The tetraiminopiperazine thus formed is of satisfactory quality for use as a fertilizer. If desired, the tetraiminopiperazine may be refined by conventional methods.

The following description is presented with reference to the accompanying drawing as illustrative of this invention.

The steps (1) of lead oxidation, (2) lead cyanamidation and (3) pyrolysis of lead cyanamide are all carried out successively in the same reactor. The reactor vessel houses a bed of 10 to 50 mesh Alundum support on which is suspended 25% by weight lead. Density is 125 pounds per cubic foot. The bed rests on a perforated alumina plate so constructed that gases may flow freely upward through it.

(1) Lead oxidation is accomplished as follows:

Air enters the bottom of the reactor bed which is at 750° C. Oxidation of lead to PbO is close to 100%. The initial reactor charge is provided by pyrolyzing lead nitrate on 10 to 50 mesh Alundum and amounts to about 8 parts by weight of lead oxide per part by weight of tetraiminopiperazine to be produced per run. After oxidation is complete, the reactor is flushed with $CO_2$ to prevent explosive combination of air and $NH_3$ in the next step.

(2) cyanamidation of lead oxide to lead cyanamide is accomplished as follows:

$NH_3$ and $CO_2$ in excess are passed through the reactor using 20 mols $NH_3$ and 2 mols $CO_2$ per cycle per mol of lead at a space velocity of 200 volumes per volume reactor space per minute at temperatures in the bed of 425° to 450° C. at about 50 p.s.i.g.

After cyanamidation is complete, the reactor is flushed with $CO_2$ to remove and conserve $NH_3$. The unreacted $NH_3$ and $CO_2$ containing water vapor is dried by means of a carbamate condenser and an amine scrubber (shown as 2A and 2B in the drawing). The carbamate condenser is designed to condense the water into an ammonium carbamate solution allowing the bulk of the dry $NH_3$ to pass overhead without liquifying as carbamate. The amine scrubber completely dries the $NH_3$ and $CO_2$ streams which are then recycled.

(3) Prolysis of lead cyanamide to lead and cyanogen is accomplished as follows:

After the cyanamidiation reaction, the temperature of the reactor bed is raised to 700 to 750° C. while sweeping with gas. Any PbO present reacts at 480 to 580° C. with PbNCN to give $N_2$ and $CO_2$, which detracts from cyanogen yield. Lead metal and a small amount of paracyanogen, i.e. $(CN)_x$, remain in the reactor.

(3A) Cyanogen absorption-desorption is accomplished as follows:

Cyanogen off-gas from the pyrolyzer is passed into an absorption zone, containing toluene, where cyanogen is absorbed while $N_2$ and $CO_2$ pass overhead; a portion being used as the sweep gas in the pyrolysis reaction and the remainer bled. The solvent-cyanogen solution then passes to the desorption zone where the temperature is raised and cyanogen passes overhead.

(4) Tetraiminopiperazine formation from ammonia and cyanogen is accomplished as follows:

The reactor is a rotating stainless steel drum with internal scraping blades and source of heat on drum wall exterior. Cyanogen is dissolved in excess liquid $NH_3$ stream in a stainless steel pipe leading to the reactor and the resulting solution is valved into the drum. Temperature should not exceed 50° C. Powdered tetraiminopiperazine (60% N) and excess recycle $NH_3$ are taken off the exit.

The following examples are presented as illustrative of the process of this invention.

EXAMPLE 1

Lead oxide was formed as follows:

About 1,656 grams of lead nitrate was dissolved in 1,500 grams of water and mixed with 1,980 grams of grit Alundum. The mixture was stirred and dried so that the lead nitrate coated the surface of the Alundum. The mixture was then heated to red heat so that the lead nitrate was decomposed to lead oxide. Heating was continued until evolution of $NO_2$ had stopped. The resulting supported lead oxide was screened to give 2,823 grams of 10 to 50 mesh material which analyzed 25.2 wt. percent lead in the form of PbO.

EXAMPLE 2

Lead cyanamide was formed as follows:

About 14.5 grams of lead oxide supported on Alundum, prepared in Example 1, was placed on a wire screen to a depth of 2 inches in a 0.5-inch inside diameter pipe reactor. Heat was supplied to the wall of the reactor and when the inside temperature reached 100° C., 340 cc./minute $NH_3$ and 480 cc./minute $CO_2$ were passed through the reactor at 50 p.s.i.g. Reaction temperature was increased to 450° C. and the $NH_3$ and $CO_2$ flows were continued at this temperature for one hour. The reaction mixture was then cooled and examined. The reaction mass was bright yellow in color. Analysis indicated 45% conversion of the PbO to PbNCN. It was found that yields increased with longer reaction times.

EXAMPLE 3

The reaction mass containing PbNCN prepared in Example 2 was pyrolyzed to produce cyanogen as follows:

The reaction mass was placed in a 0.75-inch inside diameter silica glass tube reactor and the reactor was heated in a high temperature furnace. An inert gas, helium, was passed through the reactor and the reaction mass was heated to 640–840° C. Cyanogen was given off throughout the range 640–840° C. Yield of cyanogen was 49% of theory based on PbNCN. The residual reaction material contained lead which could be reoxidized to lead oxide by treatment with air at about 700° C.

EXAMPLE 4

This example shows preparation of tetraiminopiperazine from cyanogen produced as in Example 3. About 6.14 grams of gaseous cyanogen was passed into 29.7 grams of liquid ammonia at about −80° C. The excess ammonia was evaporated leaving a dark red-brown solid. Analysis of the solid indicated that it contained tetraiminopiperazine in 81.5% yield based on the cyanogen used.

EXAMPLE 5

The crude tetraiminopiperazine obtained in Example 4 was tested to measure its availability as a fertilizer. Nitrification testing was conducted by placing 100 grams of soil in a flask together with tetraiminopiperazine equivalent to 400 pounds nitrogen per acre-six inches of soil. The soil containing the tetraiminopiperazine was incubated at 30° C. for three-week and six-week periods and nitrate nitrogen was determined in accordance with a standard procedure (see "Soil Chemical Analysis," M. L. Jackson (1958), p. 197). The results with tetraiminopiperazine were corrected for nitrate nitrogen initially in the soil, and a comparative test was made with soil containing added ammonium sulfate in the same nitrogen concentration as the tetraiminopiperazine test. Data show that the tetraiminopiperazine was not converted to nitrate as rapidly as the water-soluble ammonium sulfate. Data are tubulated below:

| Nitrogen fertilizer in soil | Percent nitrification | |
|---|---|---|
| | In 3 weeks | In 6 weeks |
| Ammonium sulfate | 90.9 | 85.7 |
| Tetraiminopiperazine | 19.7 | 63.2 |

These data indicate that the tetraiminopiperazine is gradually converted to soluble nitrate nitrogen plant food in the soil. Thus, tetraiminopiperazine fertilizer is especially desirable for growth of turf where steady growth rather than rapid growth is desired. The tetraiminopiperazine has the added advantage that it is relatively insoluble and therefore is not readily leached from the soil by heavy rains.

I claim:
1. A process for the production of tetraiminopiperazine which comprises:
   (a) reacting at a temperature of from about 380° to 500° C. lead oxide with carbon dioxide and ammonia to form lead cyanamide, at a molar ratio of the carbon dioxide to the lead oxide of at least 2:1, and at a molar ratio of the ammonia to the lead oxide of at least 10:1;
   (b) pyrolyzing the lead cyanamide to form lead and cyanogen at a temperature of from about 650° to 750° C.; and
   (c) reacting the cyanogen with ammonia to form tetraiminopiperazine.

2. A process according to claim 1 wherein the lead oxide of step (a) is formed from the lead resulting from the pyrolysis of the lead cyanamide in step (b) and unreacted carbon dioxide and ammonia of step (c) are recycled to the process.

3. A process according to claim 2 wherein step (a) is carried out essentially in the absence of water at a temperature of from about 425 to 450° C., the molar ratio of the carbon dioxide to the lead oxide is from about 2 to 20:1, and the molar ratio of the ammonia to the lead oxide is from about 20 to 200:1, step (b) is carried out at a temperature of from about 700° to 750° C. and in the presence of an inert gas, and step (c) is carried out in an excess of liquid ammonia at a temperature of from about −80° to 50° C.

4. A process according to claim 3, wherein the lead oxide is supported on an alumina carrier.

References Cited

Schmidt et al., Z. Anorg. Chem., vol. 295, p. 156–72, abstracted in Chem. Abstr. vol. 52, col. 18021h (1958).

ALTON D. ROLLINS, *Primary Examiner.*

D. G. DAUS, *Assistant Examiner.*

U.S. Cl. X.R.

23—78, 193, 260; 71—27; 252—461, 463; 260—2